Figure 9:
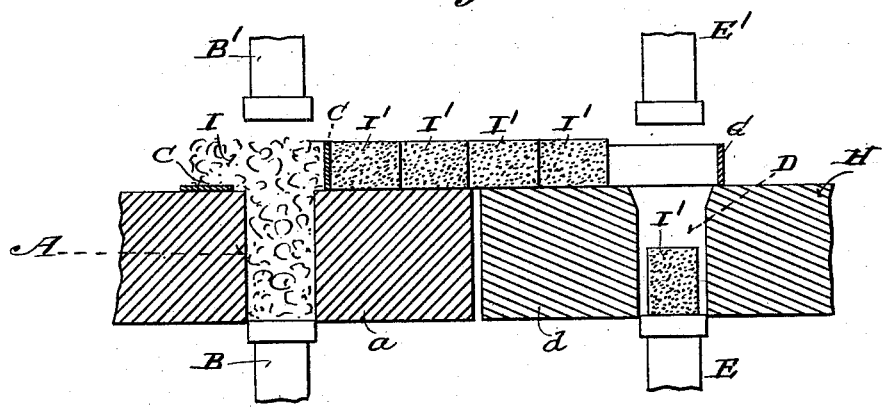

No. 630,397. Patented Aug. 8, 1899.
A. NIEDRINGHAUS.
BRICK MAKING.
(Application filed Feb. 19, 1894.)
(No Model.) 2 Sheets—Sheet 1.
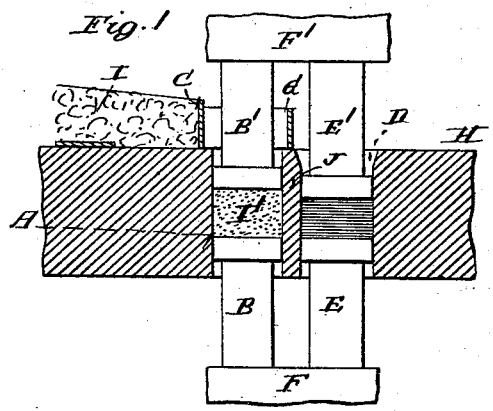
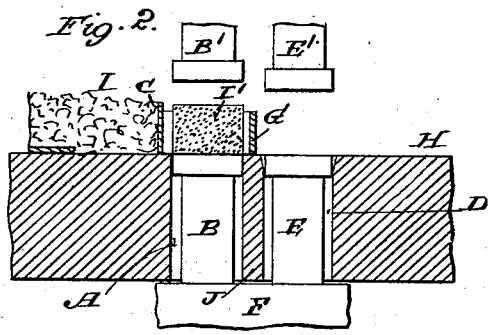
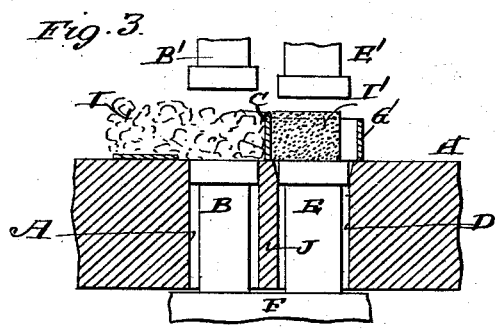
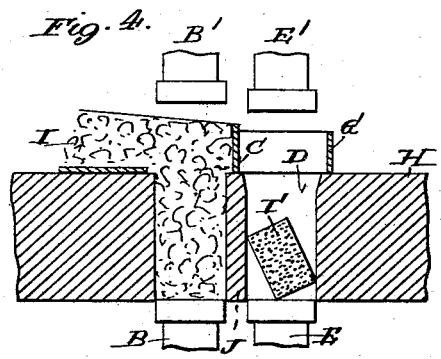
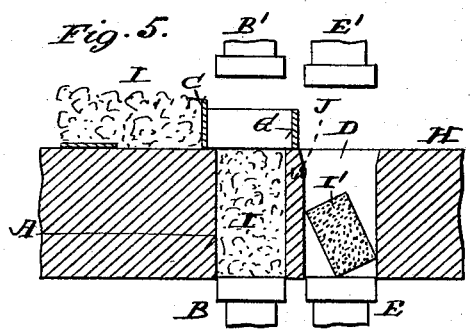
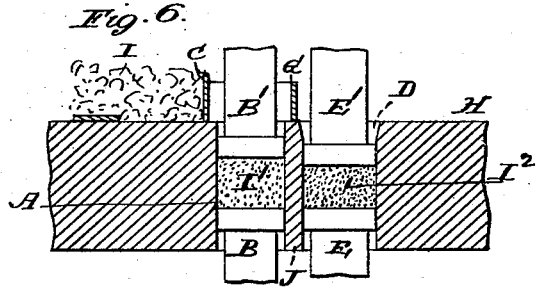
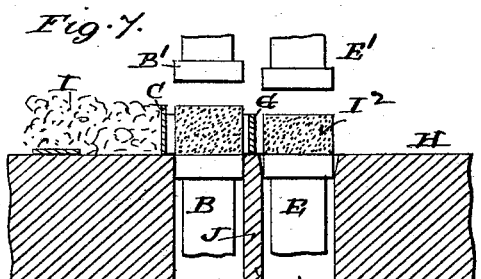
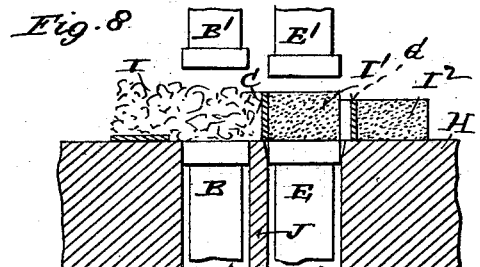
WITNESSES:
Edward W. Currell
A. Bonville
INVENTOR
Alexander Niedringhaus
by C. D. Moody
his atty No. 630,397. Patented Aug. 8, 1899.
A. NIEDRINGHAUS.
BRICK MAKING.
(Application filed Feb. 19, 1894.)

(No Model.) 2 Sheets—Sheet 2.

Witnesses:
Edward W Farrell
A. Bonville

Inventor:
Alexander Niedringhaus
by C A Moody
his atty

UNITED STATES PATENT OFFICE.

ALEXANDER NIEDRINGHAUS, OF ST. LOUIS, MISSOURI.

BRICK-MAKING.

SPECIFICATION forming part of Letters Patent No. 630,397, dated August 8, 1899.

Application filed February 19, 1894. Serial No. 500,613. (No model.)

*To all whom it may concern:*

Be it known that I, ALEXANDER NIEDRINGHAUS, of St. Louis, Missouri, have made a new and useful Improvement in Brick-Making, of which the following is a full, clear, and exact description.

This invention is an improved mode and means whereby clay may be advantageously formed into bricks ready for the kiln or subsequent drying.

The leading feature of my invention is pressing individual clay forms two or more times and in different directions. Bricks made by being pressed in individual molds or made in individual clay forms are much superior to bricks made by pressing the clay in a column and cutting the same up into individual bricks or forms, even though in some instances the individual forms so made are subsequently individually pressed and reformed. I have found in practice that when individual clay forms are pressed in one direction only there is generally a split or crack in the bricks or clay forms, near the middle thereof, in a plane at right angles to the direction of the pressure, and this even though the individval clay forms are subjected to two or more successive pressures in the same direction. This split or crack is generally at or about the middle of the clay forms and bricks and weakens the bricks very materially. I have found that by pressing individual clay forms in different directions each individual clay form is thereby kneaded more effectually and the air imprisoned in the clay more effectually forced out of the clay, thereby making a much denser brick than would otherwise be formed by pressing the clay a number of times in the same direction however great the pressure may be in pressing the individual clay forms in the same direction. Bricks made according to this invention are therefore very much more tenacious and stronger in every way. Bricks made by being pressed even a number of times in the same direction always have a tendency to break near the middle in a plane at right angles to the direction of the pressure applied in compressing the clay forms. This objection is obviated by my invention. It is not indispensable that a greater pressure be applied in the second pressing.

The leading feature of the apparatus employed in carrying out the improved method is a combination of two or more molds or a combination of two or more series of molds, together with means for pressing the clay and clay forms, respectively, therein, the molds being alongside each other or the molds in one of the series of molds being respectively alongside the molds in the other of the series, all substantially as is hereinafter set forth and claimed, aided by the annexed drawings, making part of this specification, in which—

Figure 1 is a view partly in vertical section and partly in elevation, the sectional portion representing the molds and charger and the portion in elevation the plungers of a brick-press of ordinary construction, saving as modified and supplemented by the improvement under consideration. Clay is shown in one (the first one) of the molds as receiving the initial pressure therein. The other of the molds is empty, but the plungers belonging thereto are closed thereinto; Fig. 2, a similar view saving that the plungers are raised and the clay has been pressed into its initial form and the form lifted to above the mold; Fig. 3, a similar view showing the clay form shifted from above the first mold, in which it has just been pressed, to above the second mold, in which it is to be re-formed and compressed. The charger is also shown in position to refill the first-named mold; Fig. 4, another similar view, but showing the lower plungers lowered to enable the filling of the first mold with clay and the dropping of the clay form into the second mold; Fig. 5, a view similar to that of Fig. 4, but showing the charger withdrawn; Fig. 6, another similar view showing both the upper and lower plungers closed into the molds to apply the initial pressure to the clay in the first mold and to re-form and compress the clay form in the second mold; Fig. 7, another similar view showing the upper plungers lifted above the level of the charger and the lower plungers raised to eject the contents of the molds; Fig. 8, another similar view showing the plungers as in the figure last described, but the charger moved outward to bring a fresh lot of clay above the first mold, to shift the form that has received the initial pressure in the first mold to above the second mold, and to shift the re-formed and compressed form onto the table, and Fig. 9 a view analogous to the foregoing views, showing a modified construction.

The same letters of reference denote the same parts.

A represents the ordinary mold of a brick-press.

B represents the lower plunger and B' the upper plunger, employed in pressing the clay in the mold, and C represents the charger for delivering the clay to the mold.

The parts named are constructed and operated in the ordinary manner.

D represents another mold. It is arranged alongside the first-named mold and preferably in front of the first-named mold and substantially opposite the path in which the charger travels, and it is suitably shaped to enable the re-forming and compressing of the clay form in accordance with the principle of the present improvement.

E represents a lower plunger and E' an upper plunger, adapted to work in the mold D in a manner analogous to that in which the plungers B B' work in the mold A and to co-act to re-form and compress the clay forms therein. While the last-named plungers E and E' may be otherwise actuated, they are preferably, and they are so shown, connected with and actuated by the same cross-heads F and F' with which the plungers B and B' are respectively connected and actuated.

The plungers E E' may be arranged closer together than the plungers B B', as shown in the drawings, so that the final pressure applied to the individual clay forms will be greater than the pressure applied to the clay in the primary mold.

G represents an arm or other suitable part for shifting the forms compressed in the mold D onto the table H. This arm or part for the purpose mentioned may be operated by any suitable means; but it is preferably attached to the charger C to be moved thereby outward and inward, substantially as indicated by the different positions of the arm as the charger is operated.

Figs. 1 to 8 of the drawings illustrate the operation of the improvement. The clay I having been deposited in the usual manner in the first of the molds A, the charger is withdrawn and the plungers B B' are closed into the mold to impart the initial pressure and shape to the form I', as in Fig. 1. As yet no use has been made of the second mold D, although the plungers E E' in the figure referred to are shown closed into that mold. The form I', by raising the plungers B B' in the ordinary manner, is lifted above the mold A, as shown in Fig. 2. The charger C is then moved outward, (to the right, as shown in the drawings,) serving to bring additional clay into position to refill the first mold A and also to push the form I' more or less above the second mold and into position to drop into the mold D as soon as the plunger E therein is lowered, as shown in Fig. 3. The plungers B and E are then lowered, permitting the clay to drop into the mold A and the form I' to drop into the mold D. The mold D is preferably of such a shape in horizontal cross-section and size as not only to enable the form I' to drop into it, but in dropping to be more or less turned, so as when finally lodged in the mold to present different surfaces to the plungers E and E' from those that were previously presented to the action of the plungers B B'. In Figs. 4 and 5 one position of the form is shown. In Fig. 9 another position is shown. After the mold A has been refilled and the form I' has been deposited in the mold D the charger C and arm G are withdrawn into the position of Fig. 5. The plungers B and B' are then closed into the mold A to compress the clay therein into another form I', and the plungers E E' are closed into the mold D to re-form and compress the form I' into its final form $I^2$ and substantially as shown in Fig. 6. When the form I' is more heavily re-pressed than it was originally in the mold B, the plungers E E' are closed nearer together than are the plungers B B'. The upper plungers are then withdrawn from the molds to enable them to be out of the way and the contents of the two molds to be elevated into position, substantially as shown in Fig. 7. From this last-named position the charger and the arm and the previous contents of the molds are shifted into the position of Fig. 8—that is, the charger C is moved to shift the clay form I', that has been shaped in the mold A, to above the mold D, and the arm G has been moved to shift the clay form $I^2$, that has been re-formed and compressed in the mold D, onto the table H. As represented in Figs. 1 to 8, the mold D is in immediate proximity to the mold A, the molds being separated by the partition J. Such an arrangement is a desirable one when the two molds are in the same press and as when the plungers of the two molds are actuated by the same mechanism; but this is not in all cases essential. The molds may be more or less distanced from each other, and the part d, containing the mold D, may be a separate one from the part a, containing the mold A—as, for instance, as illustrated in Fig. 9. With such a construction the charger C may not act directly upon the clay form that is being pushed into the mold D, but upon a series of clay forms which by the action of the charger are moved toward the mold D and which are successively moved into position to drop into the mold D, substantially as indicated in Fig. 9. In this arrangement the arm G or whatever is used to discharge the compressed form onto the table or other place of delivery operates substantially in the same manner as in the arrangement shown in Figs. 1 to 8. The details of the molds in the present illustration of the improvement under consideration are not attempted to be shown. The molds are understood to be of the usual construction, saving as it may be modified or supplemented to enable the operation of the improvement, as described.

The herein-described apparatus, so far as the mold D and the coacting parts are concerned, may be applied to many forms of existing brick-presses as an attachment thereto, and it can of course be embodied in an original design for a press. In the illustration given but a single primary mold A and a single re-forming mold D are shown; but the mold A may be one of a series of molds such as are commonly used in brick-presses, and the mold D may be one of a series arranged in front of the series containing the mold A; but so far as pressing the clay first lightly and then re-forming and more heavily pressing the clay or so far as pressing the clay and then re-forming and again pressing the clay is concerned the mold D and the parts immediately associated therewith may be in a separate structure; but it is very desirable to have the two molds or the two series of molds and associated mechanism in substantially a single press. When a lighter pressure is used and a heavier pressure is employed in the compressing, the same power that is commonly used in operating an ordinary brick-press amply suffices for operating the two herein-described molds or series of molds, and it is quite an advantage to be able to dispense with the handling of the brick in transferring it from one to the other of the molds. Moreover, the clay form coming from the first mold is not likely to be abraded in passing to the second mold, and thus the exact amount of clay passing into the second mold can be previously accurately determined. The temper of the clay in passing from the first to the second mold is practically unchanged. A change of temper of the clay is liable to occur when the brick is allowed to stand before being compressed. The arrangement also enables a more prompt control by the attendant of the clay-supply. Furthermore, with the ordinary dry or semidry press the bricks are very liable to split, and in working some clays the difficulty can be overcome only by running the press at a slow rate; but by means of the present improvement the operator is enabled to produce bricks wholly free from splits and checks and at a rate considerably faster than in an ordinary dry or semidry press.

A brick-press equipped with the present improvement and employing scarcely any more power has more capacity than an ordinary press in which the bricks are pressed but a single time.

By re-forming, as described, the clay forms produced in the primary mold this important advantage is obtained: The temper of the ultimate clay form is materially improved. It is necessary to so apply the second or final pressure as to effect the working of the particles of the clay upon each other; and to effect this, the second or final pressure must be applied to other surfaces of the form than those to which the original pressure was applied. The resultant form is thereby not only more homogeneous in respect to those qualities which go to improve the temper of the clay, but it is also a denser, heavier, and stronger brick.

I claim—

1. The method of making bricks herein set forth, the same consisting in first molding the clay under pressure to a form having all the laminations substantially parallel with one another, and then re-pressing the clay by pressure applied to the brick forms in the direction of the plane of the laminations produced by the first pressing, whereby the laminations are more completely broken up and the air more effectually driven out of the clay and a stronger and denser brick made.

2. The method herein set forth of making bricks, the same consisting in first pressing the clay to the form of a brick having all the laminations substantially parallel with one another, inverting the forms, and subjecting them to pressure in the direction of the plane of the laminations produced by the first pressing.

3. The combination to form a brick-pressing mechanism, of a primary mold-box in which clay is pressed into individual brick forms by pressure applied thereto in one direction, a secondary mold-box arranged adjacent to and alongside of the primary mold-box, plungers working in the respective molds in the same direction, means for delivering the forms from the primary mold-box to the secondary mold-box, and means for inverting said forms.

4. The combination to form a brick-pressing mechanism, of a primary mold-box in which clay is pressed into individual brick forms by pressure applied thereto in one direction, a secondary mold-box arranged adjacent to and alongside of the primary mold-box, and having the edge adjacent to the primary mold-box beveled or inclined, and plungers working through the respective molds in the same direction.

5. The combination to form a brick-pressing mechanism, of a primary mold-box in which clay is pressed into individual brick forms by pressure applied thereto in one direction, a secondary mold-box arranged adjacent to and alongside of the primary mold-box, plungers working in the molds and connected to the same cross-head, means for delivering the forms from the primary mold-box to the secondary mold-box, and means for inverting said forms.

6. The combination to form a brick-pressing mechanism, of a primary mold-box in which clay is pressed into individual brick forms by pressure applied thereto in one direction, a secondary mold-box arranged adjacent to and alongside of the primary mold-box, plungers working in said molds and connected to the same cross-head, the plungers working in the secondary mold-box being arranged nearer together than the plungers working in the primary mold-box, means for delivering the forms from the primary mold-box to the secondary mold-box, and means for inverting said forms.

7. The combination to form a brick-pressing mechanism, of a primary mold-box in which clay is pressed into individual forms by pressure applied thereto, a charger therefor, a secondary mold-box in which the individual clay forms are re-pressed and arranged adjacent to and alongside of the primary mold, an arm normally between the primary and secondary molds for delivering the clay forms from above the secondary mold, and means for operating said arm in the direction of the movement of the charger.

8. The combination to form a brick-pressing mechanism, of a primary mold-box in which clay is pressed into individual forms by pressure applied thereto, a charger therefor, a secondary mold-box in which the individual clay forms are re-pressed and arranged adjacent to and alongside of the primary mold, plungers working in said molds, and an arm connected to said charger and normally between the primary and secondary molds, whereby the clay forms are delivered from above the secondary mold by the movement of the charger from its normal position to its position in charging the primary mold.

Witness my hand this 12th day of February, 1894.

ALEXANDER NIEDRINGHAUS.

Witnesses:
C. D. MOODY,
A. BONVILLE.